May 19, 1959     J. C. KARLSON     2,886,898

COMPASS SYSTEM

Filed Nov. 1, 1954

INVENTOR.
JOHN C. KARLSON
BY
ATTORNEY

United States Patent Office 2,886,898
Patented May 19, 1959

2,886,898

COMPASS SYSTEM

John C. Karlson, Brooklyn, N.Y., assignor to Bendix Aviation Corporation, Teterboro, N.J., a corporation of Delaware Application November 1, 1954, Serial No. 465,963

9 Claims. (Cl. 33—222)

This invention relates to compass systems generally, and more particularly to a power supply for amplifiers and the like usable in a compass system. The invention includes a duplex power supply which provides outputs of direct current and alternating current having a frequency twice that of the reference alternating current excitation.

Earth inductor compass systems used heretofore have an alternating current excited transmitter inductive device positioned in the earth's magnetic field for generating a signal voltage having a frequency primarily twice the frequency of the excitation voltage, and a receiver inductive device cooperating therewith. The signal voltage is amplified and impressed on the variable phase of a two-phase motor mechanically connected to the receiver for driving the receiver to null position, that is, until the signal voltage is zero.

Heretofore, the compass systems used in the general type of equipment indicated immediately above, have required separate power supplies for the plate voltage of the amplifiers in the system and the alternating current frequency of double the frequency of the alternating current excitation usable in a demodulator of the system. The frequency doubler was an independent unit and was not electrically coupled with or an adjunct to an existing direct current power supply, thereby requiring extra components.

The present invention provides a unitary power source which has outputs of direct current which may be usable for supplying direct current plate voltages for amplifiers and the like, and also an alternating current frequency output which output frequency is twice the frequency of the alternating current frequency input or excitation voltage.

It is an object of the present invention to provide a novel duplex power supply having an alternating current input, and outputs of both direct current and alternating current.

Another object of the present invention is to provide a novel duplex power supply for providing direct current and double frequency sources of energy from a predetermined frequency source.

A further object of the invention is to provide a novel power supply usable in a compass system or the like wherein an alternating current excitation voltage provides a direct current output and an alternating current output of twice the frequency of the excitation voltage.

A further object of the invention is to provide a novel power supply energized by a predetermined alternating current frequency and having outputs of direct current and alternating current twice the frequency of the excitation voltage, and wherein certain elements for providing the alternating current output are also part of the load for the direct current output.

Another object is to provide a novel power supply usable in a compass system and the like wherein a single source of alternating current excitation provides a direct current output and an alternating current output of double the frequency of the excitation of the alternating current excitation with said double frequency being of improved waveform, efficiency and power output.

The present invention contemplates a unitary power supply which has an alternating current frequency input, let us say of 400 cycles, and two outputs, namely, a direct current output, and an alternating current output of twice the frequency of said alternating current input excitation.

A power transformer energized by a predetermined frequency has secondary windings coupled to a pair of primary windings of a frequency doubler transformer. A pair of rectifiers are connected intermediate said primary windings of the frequency doubler transformer to provide full wave rectification for the direct current output. The frequency doubler primary windings are connected so that each half of one cycle of the excitation voltage provides fluxes in the core of the frequency doubler transformer which aid each other, whereby the secondary of the frequency doubler transformer has an output twice the frequency of the excitation voltage, and wherein said primary windings are part of the direct current load. A portion of the direct current load includes a condenser input filter. The output of the frequency doubler transformer may be one or several independent secondaries with one of such secondaries having a capacitor thereacross to provide a tuned circuit which is reflected in all secondaries and used for improving all outputs.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and not to be construed as defining the limits of the invention.

Referring to the drawings:

Fig. 2 is a schematic wiring diagram of the duplex power supply usable in a compass system or the like.

Figure 1:
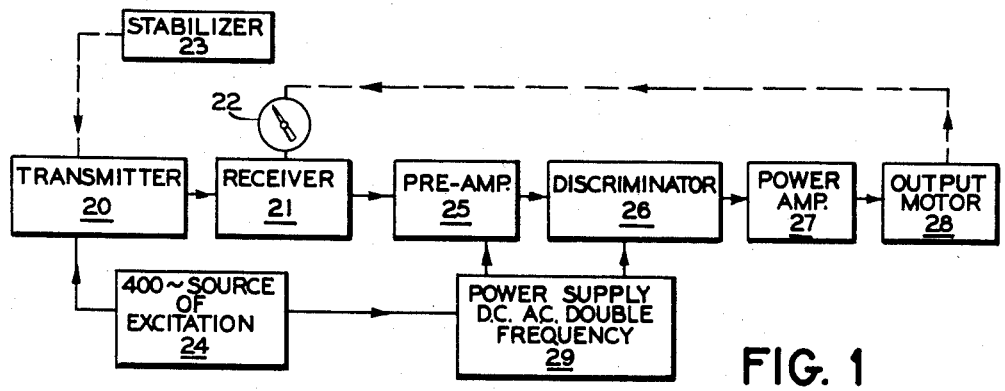
Fig. 1 is a schematic block diagram showing one embodiment of the invention.

Referring to the drawings, and more particularly to Fig. 1, there is shown a compass system which includes a transmitter 20 and a receiver inductive device 21 having a rotating index or indicator 22 mechanically connected therewith. The general arrangement of these components is shown in Patent No. 2,633,559, issued to C. M. Perkins and Allen M. McCullum, the assignee of which is the same as the assignee of the present application. Any form of conventional stabilizer 23, which may be of the gyro or pendulous type, is connected to the transmitter 20 of the earth inductor compass type. The predetermined frequency source of excitation 24 is connected to the transmitter 20 and the duplex power supply 29.

The 400 cycle source of excitation and the signal from the transmitter produces in the receiver 21 an output signal of double the frequency of the source of excitation 24. The low level signal is then fed into a pre-amplifier 25 whose output is connected to a discriminator 26 which may be of any suitable type. However, the discriminator of the present application may be of the magnetic amplifier type similar to that shown in the patent application of Abbott A. Brown, Ser. No. 459,488, for a Magnetic Amplifier Demodulator, and assigned to the assignee of the present application. Patent No. 2,797,384 issued June 25, 1957, from this application. Said Brown application requires an alternating current frequency for its resetting voltage and its gating voltage. The present application shows two alternating current frequency outputs of an identical frequency and phase suitable for use with a magnetic amplifier demodulator or discriminator of the type shown in the Abbott A. Brown application.

The output of the discriminator 26 is connected to a power amplifier 27, with said power amplifier output being connected to an output motor 28. The output motor 28 has its output mechanically connected to the indicator 22 and the receiver 21 for indicating the direction of the earth's magnetic field, and for driving the receiver to a null position, that is, until the signal voltage is zero.

The power supply 29 is also excited from the source of excitation 24 and has its unidirectional or direct current output connected to the pre-amplifier 25. The discriminator 26 has an alternating current frequency source which is double the frequency of excitation source 24, the unidirectional output being coupled to the power amplifier 27.

Figure 2:
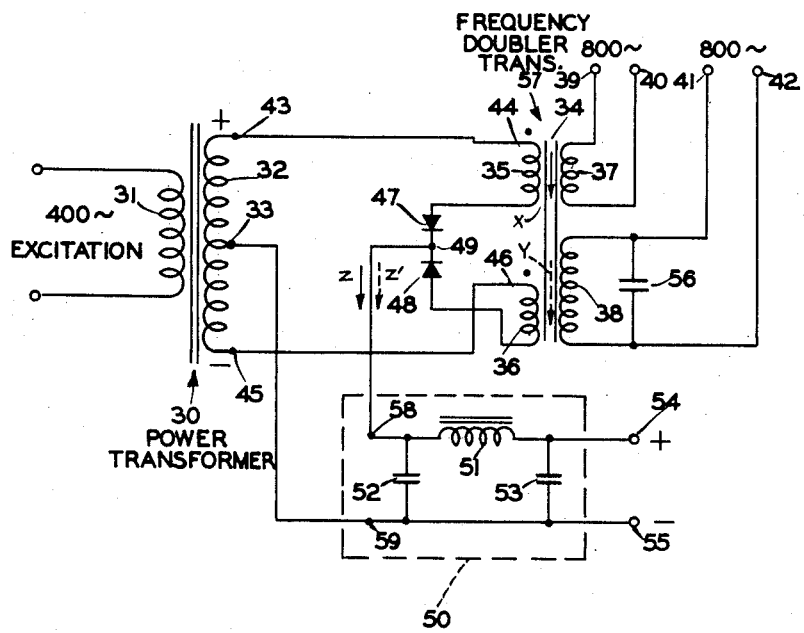

The duplex power supply shown in Fig. 2 has a power transformer 30 having a primary winding 31 which is connected to the 400 cycle source of excitation. The secondary winding 32 of the power transformer 30 has an electrical mid-tap 33. The frequency doubler transformer has a core 34 with a pair of identical primary windings 35 and 36 thereon and also output windings 37 and 38. Winding 37 is connected to output terminals 39 and 40, while the output winding 38 is connected to output terminals 41 and 42. One end of the winding 32 of the power transformer 30 is connected to a terminal 43 which is in turn connected to one end of the primary winding 35 via terminal 44. The other end of the winding 32 of power transformer 30 has a terminal 45 which is connected to one end of the primary winding 36 via terminal 46. The opposite ends of windings 35 and 36 are connected respectively to rectifiers 47 and 48 connected as shown to produce current flow on alternate half cycles as indicated by arrows Z and Z', and having an electrical mid-point therebetween connected to terminal 49.

A condenser input filter 50 consists of a choke 51, and condensers 52 and 53 connected to said choke input and output respectively and common to the electrical mid-tap 33 of the power transformer 30 at terminal 59. The common tie point between choke 51 and condenser 52 is fixed to terminal 58.

The output of the condenser input filter is connected to terminals 54 and 55 which are the output terminals for the unidirectional or direct current voltage supply.

A condenser 56 is connected in parallel with the frequency doubler transformer output winding 38 to provide a tuned circuit. Said condenser improves the output waveform not only of the particular power output across which said condenser is connected, but also improves the output waveform of all the secondaries of the frequency doubler transformer since they are tightly coupled. The characteristics of the tuned circuit provided by condenser 56 and winding 38 in such that the condenser forms a band-pass filter that reduces harmonic frequency content to a minimum while improving the desired fundamental.

The core 34 of the frequency doubler transformer 57 operatively reflects 800 cycles. The 800 cycle power output of the frequency doubler transformer is determined by the amount of current flow between terminals 33 and 49 as required by the direct current load, whatever that may be. In the present showing, the direct current load terminals 54 and 55, are connected to the plates of the pre-amplifier 25. However, the direct current load for the direct current portion of the power supply 29 may be used in other systems and in other devices, wherein the load may be a resistive load, a plate load, a bleeder, or other suitable device or component. Consequently, the direct current load is reflected across the two primary coils of the frequency doubler transformer.

In operation, when the duplex power supply 29 is connected in circuit of a system such as is shown herein, the 400 cycle excitation, via its primary winding, energizes the secondary winding 32 of the power transformer 30. With the polarities as shown on a given half cycle with terminal 43 being positive with respect to terminal 45, and with the primary windings 36 and 35 of the frequency doubler transformer 57 being connected as shown and indicated by the dot system, a flux as indicated by arrow X will be set up in core 34 since a rectifier 47 is conducting. The succeeding half cycle will cause terminal 45 to become positive so that the rectifier 48 is conducting and thereby setting up a flux in the same direction as indicated by arrow Y. Since both fluxes are in the same direction, a double frequency voltage will appear across all of the windings common to core 34. Electrical mid-point terminal 49 is connected to terminal 58.

The condenser input filter is desirable for full efficiency since the condenser 52 bypasses the alternating current component through each primary winding 35 and 36 of the frequency doubler transformer 57. Consequently, the transformer action is greatly improved in efficiency. The secondary supplies a power output at double the frequency of the excitation voltage, so that a 400 cycle power input results in an 800 cycle power output in phase with the discriminator input. The condenser input filter alternately includes in circuit therewith either the primary winding 35 or the primary winding 36, and the characteristics of the windings have impedance values that are computed as part of the load of the direct current output.

The power magnetic amplifier 27 requires unidirectional input. The input of the power magnetic amplifier is provided by the output of the discriminator 26. In order to convert the alternating current signal input of the discriminator into the required unidirectional output thereof, the magnetic amplifier discriminator must be provided with reference and gating voltages of the same frequency and phase as the 800 cycle signal input voltage. The single source of excitation 24 provides excitation, not only for the inductive transmitter 20 of the earth inductor compass type, but also provides excitation for the power supply 29 which provides two alternating current outputs, such as between terminals 39 and 40, and also between terminals 41 and 42, each output being of a frequency twice that of the 400 cycle source of excitation, or 800 cycles, which is in phase with the 800 cycle signal input of the discriminator, and a direct current output.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A duplex power supply including a first transformer means for excitation by a source of alternating current of predetermined frequency and including a secondary winding with a center-tap, a balanced load circuit including a pair of rectifiers connected to said secondary winding, a second transformer means having output windings and including a pair of substantially identical primary windings disposed on a common core and connected in series aiding relationship in said load circuit, whereby one of said pair of rectifiers and one of said pair of primary windings are alternately energized to produce in said output windings an alternating current having twice the frequency of said source of excitation, and a direct current output between the center-tap on said first transformer secondary winding and a mid-point in the balanced load circuit.

2. A duplex power supply comprising a circuit having two legs connected in series and adapted to be connected across a center-tapped source of alternating current, each leg of said circuit including a rectifier and primary winding of transformer means to provide a full wave rectified direct current output between the junction of the series connected legs and the center-tap of the source, and said transformer means having at least one secondary winding providing an alternating current output with twice the frequency of the source.

3. A device as described in claim 2 wherein a capacitor filter is connected to the direct current output to filter the direct current voltage and to provide a return path for the alternating component of the currents energizing the primary windings.

4. A duplex power supply comprising a transformer having a primary winding adapted to be connected to a source of alternating current and a center-tapped secondary winding, a circuit having two legs connected in series across the secondary winding, each leg of said circuit including a rectifier and a primary winding of transformer means to provide a full wave rectified direct current voltage at its output between the junction of the series connected legs and the center-tap of the secondary winding of the transformer, and said transformer means having at least one secondary winding providing an alternating current output with twice the frequency of the source.

5. A device as described in claim 4 wherein a capacitor filter is connected to the direct current output to filter the direct current voltage and to provide a return path for the alternating component of the currents energizing the primary windings of the transformer means.

6. A compass system having a transmitter energized by a source of alternating current and a receiver connected to the transmitter and developing a signal of twice the frequency of the source and corresponding to the displacement of the receiver from a null position relative to the transmitter, an amplifier and discriminator electrically connected to the receiver for amplifying and detecting the phase of the signal, a motor electrically connected to the discriminator and drivably connected to the receiver for driving the receiver to null position in response to said signal, a duplex power supply comprising a transformer having a primary winding connected to the source of alternating current and a center-tapped secondary winding, a circuit having two legs connected in series across the secondary winding of the transformer, each leg of said circuit including a rectifier and a primary winding of transformer means to provide a full wave rectified direct current voltage at its output between the junction of the series connected legs and the center-tap of the secondary winding of the transformer for energizing the amplifier, and said transformer means having a secondary winding providing an alternating current output with twice the frequency of the source for energizing the discriminator.

7. A device as described in claim 6 wherein a capacitor filter is connected between the direct current output of the power supply and the amplifier to filter the direct current voltage supplied the amplifier and provide a return path for the alternating component of the currents energizing the primary windings of the transformer means of the power supply.

8. A compass system having a transmitter energized by a source of alternating current and a receiver connected to the transmitter and developing a signal of twice the frequency of the source and corresponding to the displacement of the receiver from a null position relative to the transmitter, an amplifier and discriminator electrically connected to the receiver for amplifying and detecting the phase of the signal, a motor electrically connected to the discriminator and drivably connected to the receiver for driving the receiver to null position in response to said signal, a duplex power supply comprising a circuit having two legs connected in series across a center-tapped source of alternating current, each leg of said circuit including a rectifier and primary winding of transformer means to provide a full wave rectified direct current output between the junction of the series connected legs and the center-tap of the source for energizing the amplifier, and said transformer means having a secondary winding providing an alternating current output with twice the frequency of the source for energizing the discriminator.

9. A compass system as described in claim 8 wherein a capacitor filter is connected between the direct current output of the power supply and the amplifier to filter the direct current voltage and provide a return path for the alternating component of the currents energizing the primary windings of the transformer means.

References Cited in the file of this patent

UNITED STATES PATENTS

| | | |
|---|---|---|
| 844,878 | Kitsee | Feb. 19, 1907 |
| 2,308,566 | Noxon | Jan. 19, 1943 |
| 2,313,682 | Stuart | Mar. 9, 1943 |
| 2,361,433 | Stuart | Oct. 31, 1944 |
| 2,554,246 | Emerson | May 22, 1951 |
| 2,633,559 | Perkins et al. | Mar. 31, 1953 |